United States Patent [19]

Shintani et al.

[11] Patent Number: 4,760,520
[45] Date of Patent: Jul. 26, 1988

[54] DATA PROCESSOR CAPABLE OF EXECUTING INSTRUCTIONS UNDER PREDICTION

[75] Inventors: Yooichi Shintani; Tohru Shonai; Eiki Kamada, all of Kokubunji; Shigeo Takeuchi, Hanno, all of Japan

[73] Assignees: Hitachi, Ltd.; Hitachi Microcomputer Eng., both of Tokyo, Japan

[21] Appl. No.: 793,545

[22] Filed: Oct. 31, 1985

[30] Foreign Application Priority Data

Oct. 31, 1984 [JP] Japan ................................ 59-227773

[51] Int. Cl.⁴ ................................................ G06F 9/38
[52] U.S. Cl. ................................................ 364/200
[58] Field of Search ................ 364/736, 200 MS File, 364/900 MS File

[56] References Cited

U.S. PATENT DOCUMENTS

| | | | |
|---|---|---|---|
| 3,881,173 | 4/1975 | Larsen et al. | 364/200 |
| 4,251,859 | 2/1981 | Momose | 364/200 |
| 4,270,181 | 5/1981 | Yoshiyuki et al. | 364/200 |
| 4,370,711 | 1/1983 | Smith | 364/200 |
| 4,435,756 | 3/1984 | Potash | 364/200 |
| 4,471,433 | 9/1984 | Matsumoto et al. | 364/200 |
| 4,476,525 | 10/1984 | Ishii | 364/200 |
| 4,494,195 | 1/1985 | Noguchi et al. | 364/200 |
| 4,507,728 | 3/1985 | Sakamoto et al. | 364/736 |
| 4,532,589 | 7/1985 | Shintani et al. | 364/200 |
| 4,574,347 | 3/1986 | Mori et al. | 364/736 |
| 4,580,238 | 4/1986 | Sawada | 364/736 |
| 4,594,655 | 6/1986 | Hao et al. | 364/736 |
| 4,594,659 | 6/1986 | Guenthner et al. | 364/200 |
| 4,604,691 | 8/1986 | Akagi | 364/200 |
| 4,608,633 | 8/1986 | Boothroyd et al. | 364/200 |
| 4,636,943 | 1/1987 | Horst et al. | 364/200 |
| 4,644,466 | 2/1987 | Saito | 364/200 |
| 4,651,276 | 3/1987 | Vahlstrom et al. | 364/200 |
| 4,654,785 | 3/1987 | Nishiyama et al. | 364/200 |

Primary Examiner—Gareth D. Shaw
Assistant Examiner—Viet Q. Nguyen
Attorney, Agent, or Firm—Antonelli, Terry & Wands

[57] ABSTRACT

A buffer or a plurality of buffers are provided each for holding a write address and an address specifying a write position which are obtained as a result of an execution based on a predicted result. The execution of the instruction is continued up to the operation stage regadless of whether or not the instruction is being executed in the predicted state, the data and the write address are held in the buffer written. The data in the buffer is canceled if the prediction is found to be wrong when the predicted state is completed, and the data is utilized if the prediction is found to be correct.

10 Claims, 11 Drawing Sheets

DATA PROCESSOR CAPABLE OF EXECUTING INSTRUCTIONS UNDER PREDICTION

CROSS REFERENCE TO RELATED APPLICATIONS

This application is related to a U.S. patent application Ser. No. 597,744, now U.S. Pat. No. 4,719,570, filed on Apr. 6, 1984 under claiming Convention Priority for Japanese Patent Application No. 24749/80 filed on Feb. 29, 1980 and published as the Japanese Patent Unexamined Publication No. 56-123041.

BACKGROUND OF THE INVENTION

The present invention relates to a digital computer, and in particular, to a data processing system in which a succeeding instruction is concurrently executed with a preceding instruction before a preceding instruction conceptually ahead thereof completes its execution, using a predicted result of the preceding instruction, thereby achieving a higher-speed processing.

In a general-purpose, large-sized digital computer, simultaneous processing of a plurality of instructions has been generally effected, for example, in the pipeline and concurrent processing systems to develop a high processing speed. The computers of this kind include IBM 3033 described in "Internal Design and Performance of IBM 3033", Nikkei Electronics, General-Purpose Computers, pp. 251-263 and IBM 360/91 discussed in "An Efficient Algorithm for Exploiting Multiple Arithmetic Units", IBM Journal, Jan., 1967.

The IBM 3033 processes a Branch instruction as follows to increase the processing speed. In order to start interpreting a succeeding instruction before the result of the preceding branch instruction is obtained, the system predicts whether or not the branch condition is met and interprets the succeeding instruction using the prediction until the branch instruction result is attained.

On the other hand, the IBM 360/91 is provided with a plurality of arithmetic or logical operation units (ALU's) for independently processing instructions so as to execute a high-speed processing. In this system, as soon as necessary input operands are set for an instruction, an operation of the instruction is started even if it is conceptually after another instruction, thereby implementing the concurrent processing.

According to the prior art prediction system, only the interpretation of the succeeding instruction is executed in the predicted state, namely, the operation is not effected. In the conventional concurrent processing system, it has been impossible to execute an instruction next to a branch instruction in the predicted state.

To improve the processing speed, the present invention extends the prediction processing system to be applicable to the operation of the instruction following the branch instruction. To this end, a plurality of ALU's need only be used to concurrently execute operations of a plurality of instructions; however, the inventors have found a fact that the following problem occur in this case. When a Store instruction to store data from a general-purpose register in the main storage is executed in the predicted state, if the prediction is found to be wrong after the data is stored in the cache memory or main storage, then these operations are unfavorable for the following two reasons. First, since the store instruction should have not been executed, the content of the cache memory or main storage must be recovered to the original state. Consequently, a control logic is necessary to cope with this case, and hence an excessive time loss takes place for the recovery, which may possibly prevent the system from executing a higher-speed processing. Secondly, when the cache memory or main storage is shared among a plurality of central processing units (CPU's) and channels, the wrong result of the store instruction may possibly be fetched by another CPU or channel before the pertinent CPU completes the recovery of the cache memory or main storage, which is not allowable in most cases.

The operation to execute an instruction in the predicted state for reading data from the main storage has been described in the Japanese Patent Unexamined Publication Nos. 51-40824 and 56-123041 and West German Patent Application laid-open DE-OS 3,106,881 A1 (corresponding to the latter publication).

SUMMARY OF THE INVENTION

It is therefore an object of the present invention to provide a data processing system in which the execution of an instruction is achieved up to the operation thereof in the predicted state without necessitating an operation to recover the written data in case of a failure in the prediction, moreover, the wrong data written in the main storage cannot be fetched by the other CPU's or channels.

According to the present invention, there is provided a data processing system comprising a buffer or a plurality of buffers for holding a write address and an address specifying a write position which are obtained as a result of an execution under prediction of an instruction and means for continuing the execution of the instruction up to an operation stage regardless of whether or not the instruction is being executed in the predicted state, for keeping the data and the write address in the buffer, for preventing from being written in the resultant data write stage until the predicted state is released, for canceling the data in the buffer if the prediction is found to be wrong when the predicted state is released later on, and for writing the data if the prediction is found to be correct.

BRIEF DESCRIPTION OF THE DRAWINGS

The present invention will be apparent from the following detailed description taken in conjunction with the accompanying drawings in which.

DESCRIPTION OF THE PREFERRED EMBODIMENT

An embodiment of the present invention will be described. A machine based on the IBM System 370 Architecture will be assumed for convenience of description.

Figure 1A:
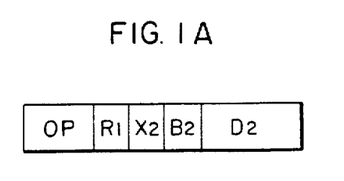
FIG. 1A is a schematic diagram illustrating a first instruction format typical in the prior art.
Figure 1B:
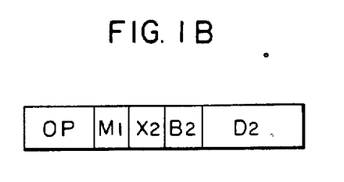
FIG. 1B is a schematic diagram depicting an instruction format of a Branch instruction.

FIG. 1A is a diagram of an instruction format of instructions such as a floating-point add (AD) instruction or a store (ST) instruction in which an $R_1$ field indicates a register number of a register for storing a first operand of the instruction, and fields $X_2$, $B_2$, and $D_2$ represent an index register number, a base register number, and a displacement, respectively for creating an address of a second operand. FIG. 1B is a diagram showing a format of a Branch on Condition (BC) instruction in which an OP field indicates that the instruction is a BC instruction, an $M_1$ field contains a mask representing a value of a condition code for which the branch is to be executed, and fields $X_2$, $B_2$, $D_2$ indicate an index register number, a base register number, and a displacement, respectively for creating a branch destination address.

Figure 2:
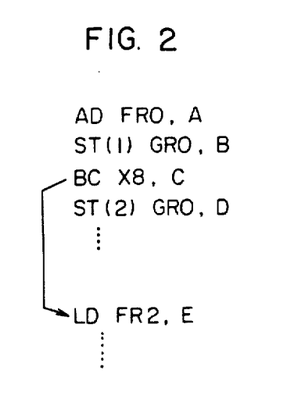
FIG. 2 shows an example of a series of instructions.

FIG. 2 shows an example of a series of instructions. The first instruction is an AD instruction for executing an addition of a floating-point register FR0 and data at memory address A. A condition code is set according to the result of the addition. The ST(1) instruction following the AD instruction stores the content of a general-purpose register GR0 in the memory at address B. The condition code is kept unchanged. The next BC instruction determines whether or not the branch condition is satisfied depending on the value of the condition code at execution thereof. If the branch condition is satisfied, control is passed to an LD instruction; otherwise, an ST (2) instruction following the BC instruction is executed. The ST (2) instruction is not dependent on the BC and AD instructions with respect to data, excepting that whether or not it is executed is determined by the judgement of the branch condition of the BC instruction. Moreover, the values of the operand registers for the AD and ST (1) instructions are to be set in advance. The LD instruction is an example of an instruction used as the jump destination when the branch condition is met.

Figure 3:
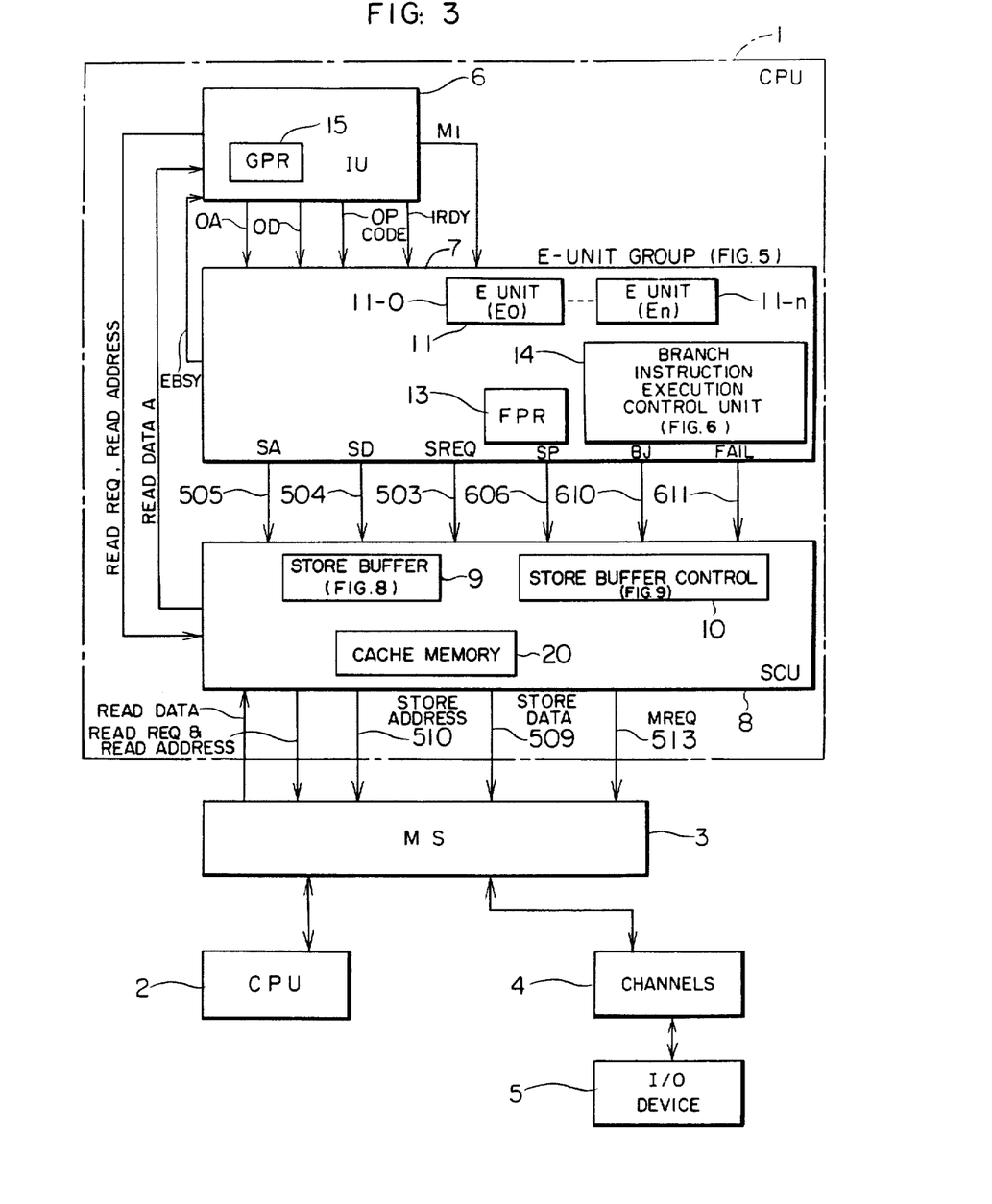
FIG. 3 is a simplified block diagram of the data processing system according to the present invention.

FIG. 3 is a block diagram illustrating the data processing system according to the present invention. The system comprises CPU's 1-2, a main storage 3 for storing programs and data, an input/output (I/O) device 5, and channels 4 for controlling data transfer between the I/O device 5 and the main storage 3. The CPU's and channel 4 each are connected to the main storage 3 so as to perform read/write operations thereon.

The CPU 1 includes an instruction control unit 6, a group of E units 7, and a storage control unit 8.

The instruction control unit 6 comprises an instruction fetch circuit (not shown), an instruction decode circuit (not shown), an operand address calculate circuit (not shown), an operand fetch circuit (not shown) and a general purpose register 15, which can be constructed in the same fashion as the prior art circuits. Assume that the instruction control unit 6 has already fetched an instruction. Then, the instruction is decoded in the instruction control unit 6. If a memory reference is found to be necessary, the content of the GPR 15 is read as an address register. An addition is conducted on the obtained data and a part of the instruction field, thereby calculating an address.

Moreover, the instruction control unit 6 issues an operand fetch request to the storage control unit 8. The fetched operand is transferred from the storage control unit 8 to the instruction control unit 6 and is kept therein until an instruction setup for the E-unit group 7 is carried out. If there exists an idle E unit in the E-unit group 7 when all the operand data items are arranged, the instruction control unit 6 executes the instruction setup. The operand data items are set to idle units in the E-unit group 7 comprising E units E0, E1, and so forth. The E-unit group 7 includes floating-point registers 13. When executing an AD instruction, an FPR 13 of which the FPR number is specified by the AD instruction is read, and the data read is set to an idle E unit. When an instruction setup is executed for an ST instruction, an OA output, namely, the store address from the instruction control unit 6 is set to an idle E unit. For a Store (ST) instruction, the E-unit group 7 only issues a store requent (SREQ) via a signal line 503 to the storage control unit 8 so as to transmit the operand data (store data, SD) via a signal line 504 and to send the store address (SA) via a signal line 505 to the storage control unit 8. The E-unit group 7 has a branch instruction execution control unit 14 for controlling a branch instruction which transmits a signal, SP indicating the predicted branch state via a signal line 606 and sends a branch judge signal, BJ and a branch prediction fail signal, FAIL via signal lines 610 and 611, respectively to the storage control unit 8. The storage control unit 8 performs the instruction and operand fetch operations from the instruction control unit 6 and receives a store request from E-unit group 7; furthermore, it carries out an address conversion if necessary, thereby referencing the main storage 3. In addition to an ordinary control circuit, the storage control unit 8 is provided with a store buffer 9, store buffer control circuit 10, and a cache memory 20 in accordance with the present invention.

Figure 4:
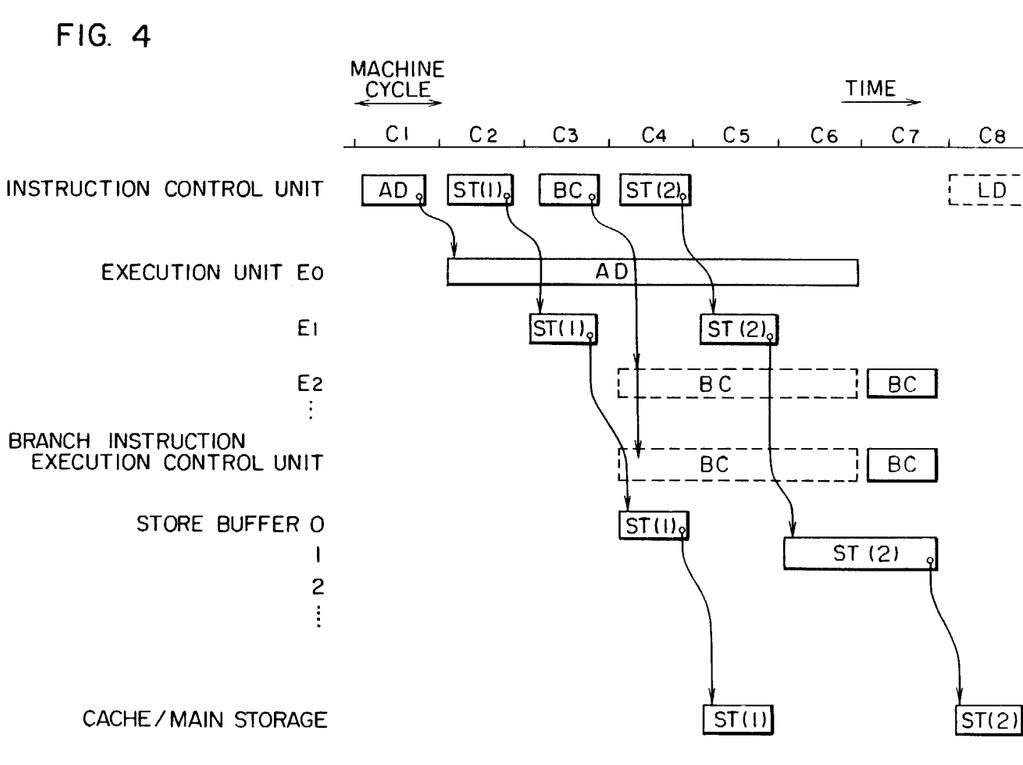
FIG. 4 is a timing chart representing execution of the instruction of FIG. 2 in the system of FIG. 3.

FIG. 4 is a timing chart of an operation of the CPU 1 executing a series of instructions of FIG. 2 in the main storage 3. The abscissa indicates the time in terms of machine cycles, whereas the logical units and circuits for executing instructions are shown along the ordinate. In this timing chart, a period of time during which processing of an instruction is executed by the respective logic unit or circuit is represented by an instruction mnemonic enclosed in a rectangle. The period of time from when the instruction control unit 6 starts decoding the AD instruction to when a write operation on the main storage 3 by the ST (2) instruction is assumed to be subdivided into cycles $C_1$, $C_2$, ..., $C_8$ in this order.

In the cycle $C_1$, the AD instruction is decoded and an operand fetch is achieved, whereas from the $C_1$ through $C_6$, the operation is executed in the execution unit $E_0$. Although not shown in the timing chart, the result is stored in the floating-point register (FPR) 13 in the E-unit group 17 and the condition code is written in a program status word (PSW, not shown) during the cycle $C_7$.

For the ST (1) instruction, the instruction decode and write address calculation are effected in the instruction control unit 6 during the cycle $C_2$, then the resultant data is set to an execution unit $E_1$ during the cycle $C_3$. In the $C_4$, a store request SREQ is issued from the E-unit group 7 to the storage control unit 8 so as to store the store address and data in the store buffer 9. If all the preceding branch executions are assumed to have completed their execution, the ST (1) instruction is considered to be processed in other than the predicted state or non-predicted state; and hence the branch prediction signal (SP) turns off. Consequently, the store buffer control circuit 10 immediately issues a store request (MREQ) via a signal line 609 to the cache memory 20 so that the write address and data are fetched from the store buffer 9 and are transmitted via signal lines 511 and 512, respectively to the cache memory 20, which in turn writes the store data therein in the cycle $C_5$.

When executing the BC instruction, the instruction decode is achieved in the $C_3$ and the resultant data is set to the execution unit $E_2$ in cycle $C_4$; however, since the processing of the preceding AD instruction has not been completed, the branch judgement to be carried out by use of a condition code set by the AD instruction cannot be executed, so the processing is not effected until the cycle $C_6$. Since the condition code of the AD instruction is set in the cycle $C_6$, the branch judgement for the BC instruction is achieved in the cycle $C_7$. The instruction setup of the BC instruction on the execution unit $E_2$ and that on the branch instruction execution control unit 14 are performed at the same time. For the ST (2) instruction, the instruction decode is executed during the cycle $C_4$. Whether the ST (2) instruction is to be executed or not cannot be naturally determined because the branch judgement of the BC has not been set before the cycle $C_4$. In accordance with the present invention, however, the processing of the ST (2) instruction is commenced under prediction that the branch condition is always unsatisfied for the BC instruction. The setup of the ST (2) instruction is achieved on the execution unit $E_1$ during the $C_5$ and the store data and address are temporarily stored in the store buffer 9. The predicted state signal (SP) is then turned on to indicate that the ST (2) instruction is in the predicted state and a prediction flag (to be described later) is set in the store buffer control circuit 10. On the other hand, the branch judgement of the BC instruction is set during the $C_7$.

The following paragraphs describe operations to be taken when the branch is not executed, namely, the prediction is found to be successful. In this case, the prediction flag of the ST (2) instruction stored in the store buffer 9 is reset, and the store data is written in the cache memory 20 or the main storage 3 at a location indicated by the write address.

Next, operations to be taken when the prediction is found to be unsuccessful based on the branch judgement of the BC instruction will be described. In this case, the store adress and data for the ST (2) instruction in the store buffer 9 is canceled. Thereafter, the processing of the branch destination instruction, namely, the LD instruction is commenced in the cycle $C_8$.

With these provisions, the execution unit $E_1$ can be set to the idle state during the $C_6$ in any cases so as to be available for the operation of the succeeding instruction, which helps improve the instruction processing speed when the other execution units are busy.

Figure 5:
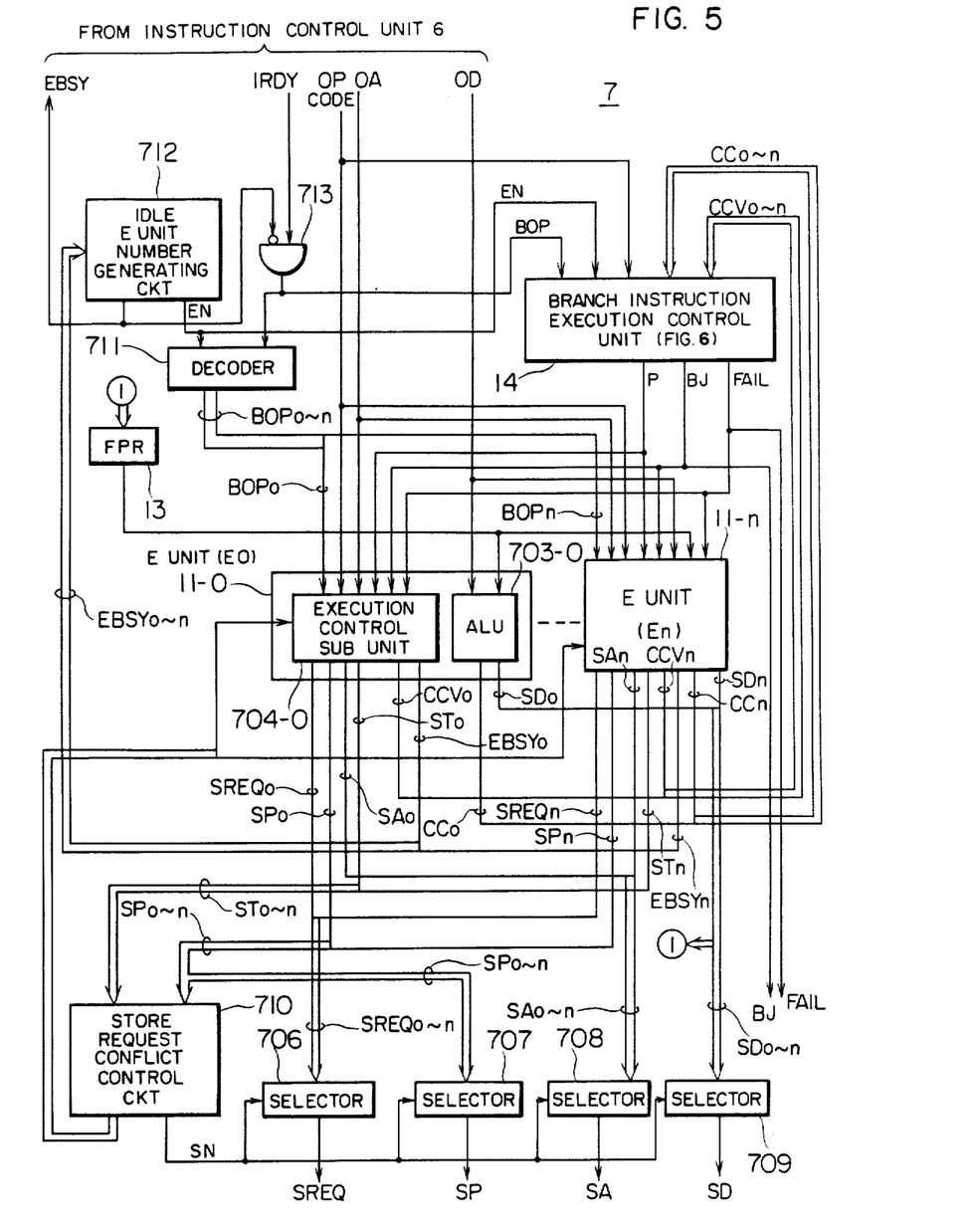
FIG. 5 is a schematic block diagram of the E unit group 7 in the system of FIG. 3.

Referring to FIG. 5, the E-unit group 7 will be described in detail. Reference numerals 11-o to 11-n indicate execution units $E_0 - E_n$ which are $n+1$ in number. They each execute an operation of an instruction set by the instruction control unit 6. To this end, each execution unit $E_i$ includes an arithmetic logic unit (ALU) 703-i and an execution control subunit 704-i. The ALU 703-i is used to set thereto an operand, OD from the instruction control unit 6, and an operand from the FPR 13 for a floating-point instruction. The operation is conducted in response to a control signal (not shown) from the execution control subunit 704-i, then a resultant data SDi is transmitted to the FPR 13 and a selector 709. In addition, a resultant condition code CCi is transmitted from the i-th ALU 703-i to the branch instruction execution control unit 14. The execution control subunit 704-i controls the i-th ALU 703-i by use of an integrated microprogram according to an OP code; furthermore, it keeps the operand address (OA) set by the instruction control unit 6. The execution control subunit 704-i receives a store instruction wait signal, WAITi sent from a store request conflict control circuit 710. If a Store instruction is in process in the execution unit $E_i$ when the WAITi signal is on, the processing is prevented from being executed. That an instruction has been set to the execution unit $E_i$ is indicated if an operation begin signal BOPi transmitted from a decoder 711 is on. Furthermore, a branch prediction signal P and a branch judge signal BJ are sent from the branch instruction execution control unit 14 to the execution control subunit 704-i. On the other hand, a signal STi indicating that the Store instruction is in process and a prediction flag SPi are transmitted from the execution control subunit 704-i to the store request conflict control circuit 710, and a store request SREQi, a store address SAi, a prediction flag SPi, and a CC validity signal CCVi are sent to the selector 706, selector 708, selector 707, and branch instruction execution control unit 14, respectively. An EBSYi signal indicating that the operation is being executed is transmitted to an idle E-unit number generating circuit 712.

The idle E unit number generating circuit 712 receives ALU busy signals EBSYo to EBSYn sent from the execution control subunits 704-0 to 704-n, respectively and selects one of these signals set to off according to an appropriate algorithm (for example, to select a signal having the least idle ALU number among them), then it sends the number EN (idle ALU number) to the decoder 711 and the branch instruction execution control unit 14. If all EBSYi signals are on, it sends an EBSY signal to the instruction control unit 6 to prevent the instruction decode from being executed.

When an AND gate 713 detects that the IRDY is on indicating that the EBSY is off and that the instruction setup is possible, it transmits the IRDY as the operation begin signal BOP to the decoder 711 and the branch instruction execution control unit 14.

When the BOP is on, the decoder 711 turns on an operation begin signal BOPi of an E unit $E_i$ corresponding to a number i indicated by the EN and transmits the BOPi to the E unit Ei.

The branch instruction execution control unit 14 comprises a circuit for executing a Branch instruction. As a result of the execution, it generates the branch predicted state signal P, the branch judge signal BJ, and the branch prediction fail signal FAIL. For this purpose, this unit 14 receives the operation begin signal BOP from the AND gate 713, the idle ALU number EN from the idle E unit number generating unit 712, the OP code from the instruction control unit 6, and the condition codes CC0–CCn and condition code validity signals CCV0–CCVn from the execution control subunits 704-0 to 704-n, respectively.

The store request conflict control circuit 710 receives the store instruction in process indicate signals ST0–STn and the prediction flags SP0–SPn. If there exist any numbers (i) for which STi is on and SPi is off, it selects one of the numbers (for example, the least number is selected). If there does not exist such a number, it checks whether or not there exist any numbers for which STi and SPi are on, When this is the case, the control circuit 710 selects one of them (for example, the least number is selected). The selected value is sent as the E unit number SN of the E unit to be selected to the selectors 706–709. If at least one Store instruction exists in the E units E0–En, the SN indicates the number of an E unit containing the Store instruction to be transmitted to the storage control unit 8.

If two or more STi signals are on, the store request conflict control circuit 710 turns on a store instruction wait signal WAITj (the number of signals set to on is n, while the total signals are n+1 in number) corresponding to a number j other than the number indicated by the SN determined according to the selection logic. If a Store instruction is in process in an E unit other than the E unit associated with the SN, the processing is postponed until the E unit number becomes equal to the SN.

The selectors 706–709 receive the store request signals SREQ0–SREQn, the prediction flags SP0–SPn, the store address signals SA0–SAn, and the store data signals SD0–SDn, respectively and selects the inputs corresponding to the SN, then it transmits the selected signals as the store request SREQ, the prediction state SP, and the store data SD to the storage control unit 8.

Figure 6:
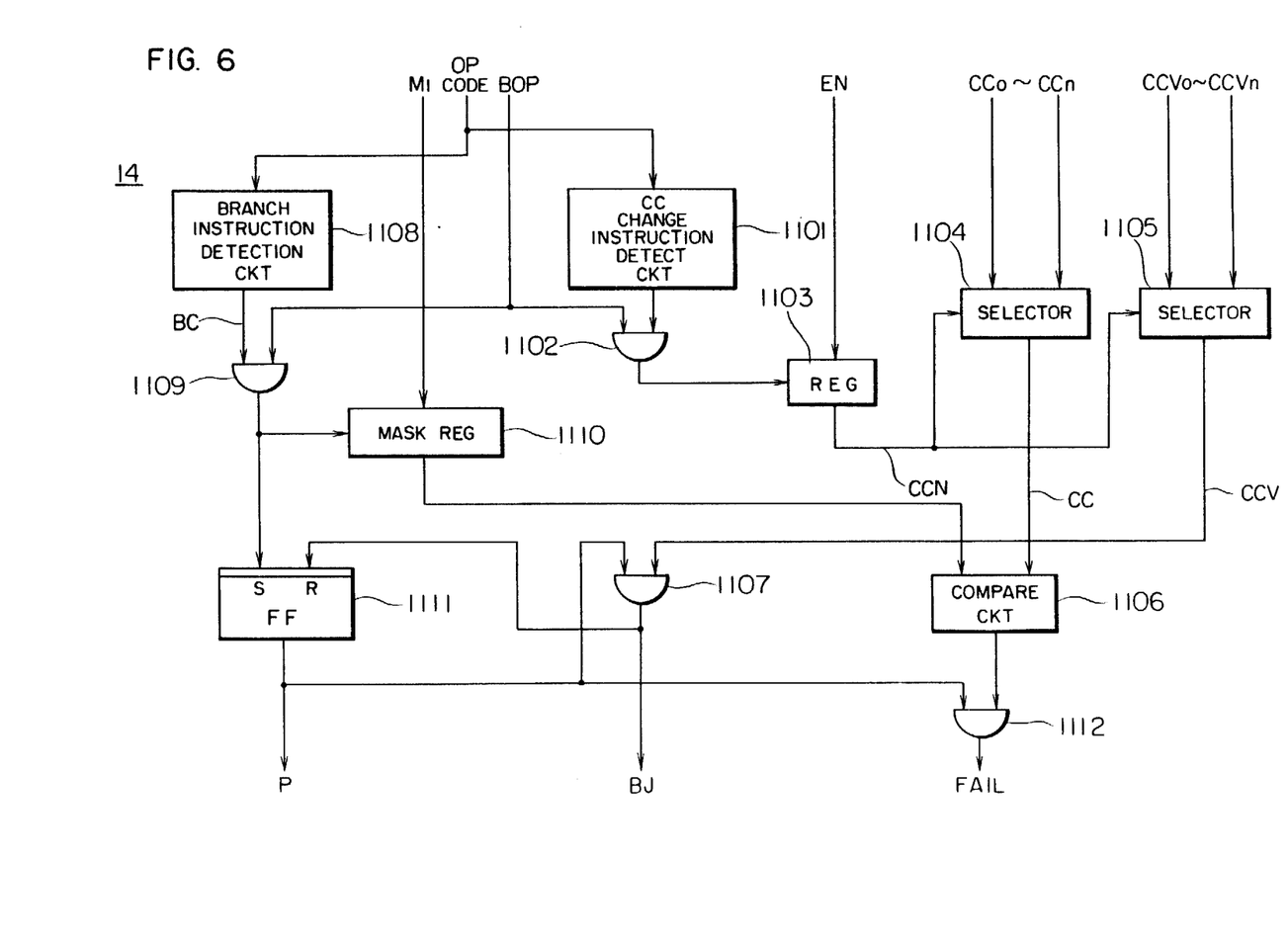
FIG. 6 is a simplified block diagram of the Branch instruction execution control unit 14 in the circuit of FIG. 5.

Referring to FIG. 6, the branch instruction execution control unit 14 will be described in detail. A reference numeral 1101 indicates a CC change instruction detection circuit. When the OP code represents a CC Change instruction (namely, the second AD instruction in the embodiment), the detect circuit 1101 sets its output signal to ON and sends this signal to an AND gate 1102. If the BOP signal from the AND gate 713 and the output signal from the detect circuit 1101 are on, the AND gate 1102 turns its output on to cause a register 1103 to store an idle ALU number EN. The ALU number CCN associated with the latest instruction that has changed the CC is stored in the register 1103 and is transmitted to the selectors 1104 and 1105. The selectors 1104 and 1105 receive the condition codes CC0–CCn and the condition code validity signals CCV0–CCVn, respectively and select the inputs CCi and CCVi associated with the number i indicated by the ALU number (CCN) signal, respectively, then the selected signals are sent as the condition code CC and condition code validity signal CCV to a compare circuit 1106 and an AND gate 1107, respectively.

A reference numeral 1108 indicates the branch instruction detect circuit. When the OP code represents a BC instruction, the detect circuit 1108 turns its output BC on and sends the signal BC to an AND gate 1109. If the input signals BC and BOP are on, the AND gate 1109 turns its output on to cause a mask register 1110 to store a mask field (the $M_1$ field of FIG. 1B) of the instruction. At the same time, the detect circuit 1108 sets a flip-flop circuit 1111 to one. The flip-flop 1111 outputs a branch prediction signal P indicating that the Branch instruction is in process, and the signal P is sent to the AND gates 1107 and 1112 and the E units 11-0 to 11-n (FIG. 5).

When the prediction signal P and the condition code validity signal CCV each are on, the AND gate 1107 outputs a branch judge signal BJ to reset the flip-flop 1111 to zero. The signal BJ is further sent to the E units 11-0 to 11-n (FIG. 5) and the storage control unit 8 (FIG. 3).

When a bit of the mask register 1110 indicated by the value of the condition code CC inputted from the selector 1104 is on, the compare circuit 1106 turns its output on and sends the output signal to an AND gate 1112.

The AND gate 1112 generates a logical product from the branch prediction flag P and the output from the compare circuit 1106 and delivers the output as a branch prediction fail signal FAIL, which is then sent to the E units 11-0 to 11-n (FIG. 5) and the storage control unit 8 (FIG. 3). In the embodiment, the branch prediction flag P is on during four cycles $C_4$–$C_7$, whereas the branch judge signal BJ is on during the cycle $C_7$. For a branch prediction failure, the branch prediction fail signal FAIL turns on in the cycle $C_7$. If the branch prediction is successful, the branch prediction fail signal FAIL remains off.

Figure 7:
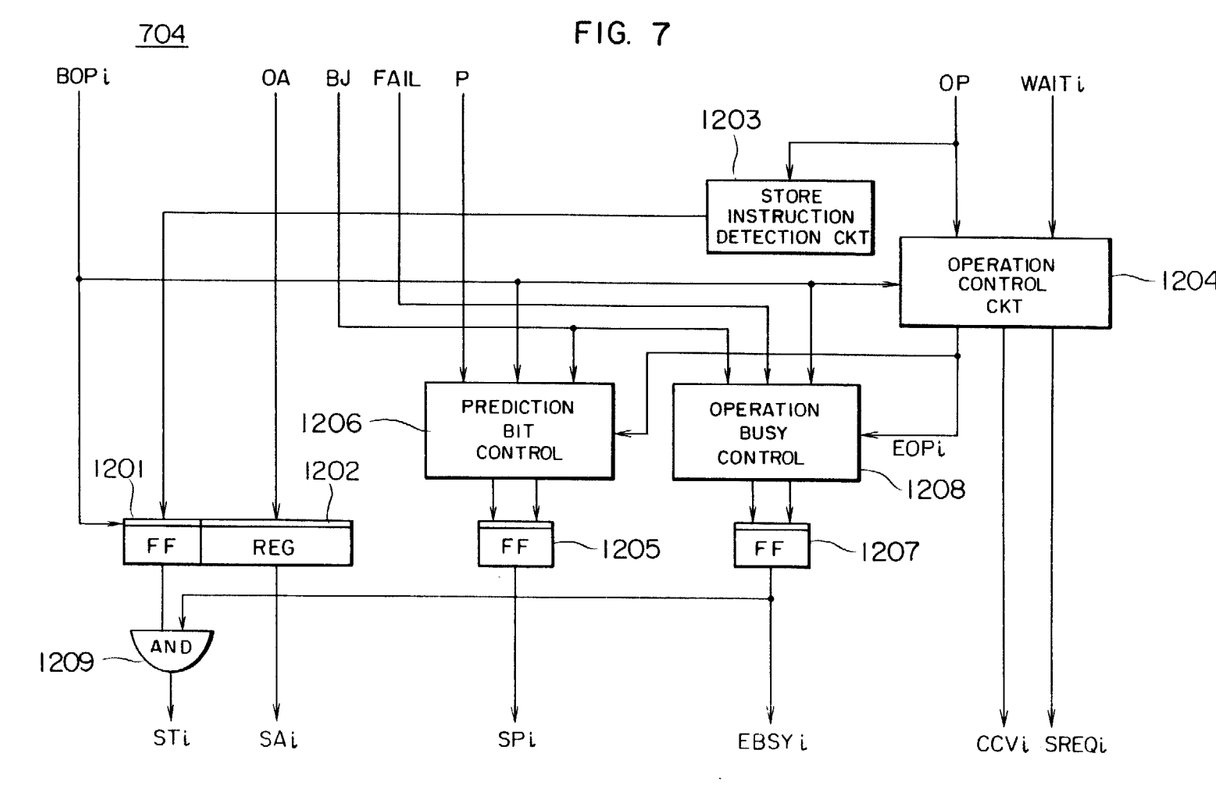
FIG. 7 is a block diagram of the execution control subunit 704 in the circuit of FIG. 5.

Referring now to FIG. 7, the execution control subunit 704 will be described in detail. A reference numeral 1203 represents the store instruction detect circuit, which turns its output on when the operation code OP indicates a Store instruction. Reference numerals 1201 and 1202 represent a flip-flop and a register, respectively. When the operation begin signal BOPi is on, the detection result from the store instruction detect circuit 1203 and the operand address OA are stored in the flip-flop 1201 and the register 1202, respectively. When the operation begin signal BOPi is on, an operation control circuit 1204 controls an operation for the instruction specified by the operation code OP by use of an integrated microprogram. When a Store instruction is executed, the operation control circuit 1204 issues a store request SREQi. Moreover, when processing a CC change instruction, the control circuit 1204 controls the condition code validity signal CCVi invalidating the condition code CC to be off until the condition code CC is determined, and it turns the CC signal on immediately after the condition code CC is determined. When the operation is completed, it turns the operation end signal EOPi on. The EOPi signal is transmitted to the prediction bit control circuit 1206 and the operation busy control circuit 1208. If the WAITi signal is on when executing a Store instruction, the operation control circuit 1204 prevents the Store instruction from being executed, which can be easily achieved by testing the WAITi signal by us of the microprogram associated with the Store instruction. Reference numeral 1205 indicates a flip-flop for outputting the prediction flag signal SPi. The prediction bit control circuit 1206 controls the set and reset lines so that the flip-flop 1205 fetches the value of the branch prediction signal P when the operation begin signal BOPi is on. If the branch judge signal BJ and the operation end signal EOPi are on, the control circuit 1206 turns the reset line on to reset the flip-flop 1205. The flip-flop 1207 outputs the EBSYi signal. The operation busy control circuit 1208 turns the flip-flop 1207 on when the BOPi signal is on. If the EOPi signal is on or if the branch judge signal BJ and the branch prediction fail signal FAIL are on, the operation busy control circuit 1208 controls the set and reset signals of the flip-flop 1207 to turn the flip-flop 1207 off.

An AND gate 1209 creates a logical product of the outputs from the flip-flops 1201 and 1207 and outputs the product signal as the store instruction in process indicate signal STi.

Figure 8:
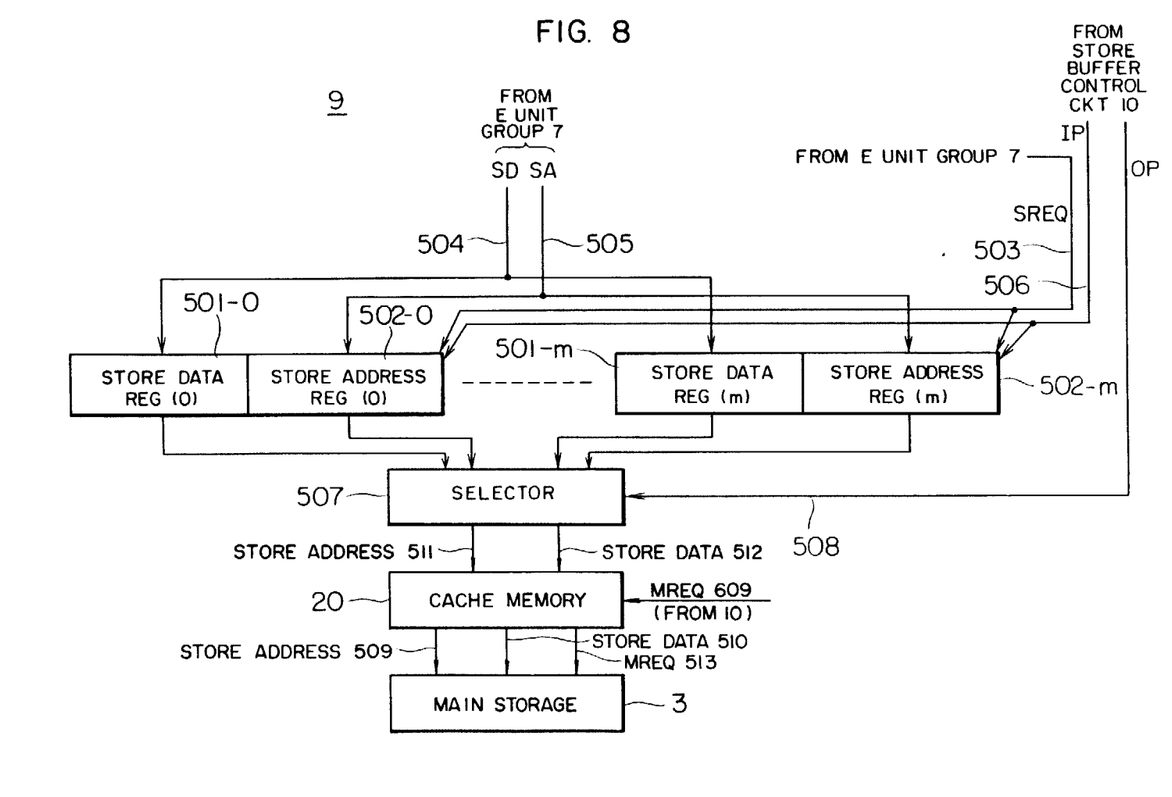
FIG. 8 is a schematic block diagram of the store buffer 9 in the system of FIG. 3.

FIG. 8 is a schematic block diagram showing the construction of the store buffer 9, which comprises store data registers 501-0 to 501-m (m+1 in number) and store address register 502-0 to 502-m (m+1 in number). When an ST instruction is executed in the E unit group 7, a store request signal SREQ is issued via a signal line 503 from the E unit group 7. At the same time, the store data SD and the store address SA sent therefrom via signal lines 504 and 505, respectively are stored in the store data register 501-i and the store address register 502-i (i=0—m). In this case, the register number i is indicated by an input pointer IP sent via a signal line 506 from an store buffer input control circuit 604.A selector 507 selects the contents of the store data and address registers associated with a number indicated by an output pointer transmitted via a signal line 508 from a store buffer output control circuit 607 and sends the selected contents via signal lines 512 and 511, respectively to the cache memory 20. The cache memory sends a store address, a store data and a MREQ signal via lines 509, 510 and 513 to the main storage 3.

Figure 9:
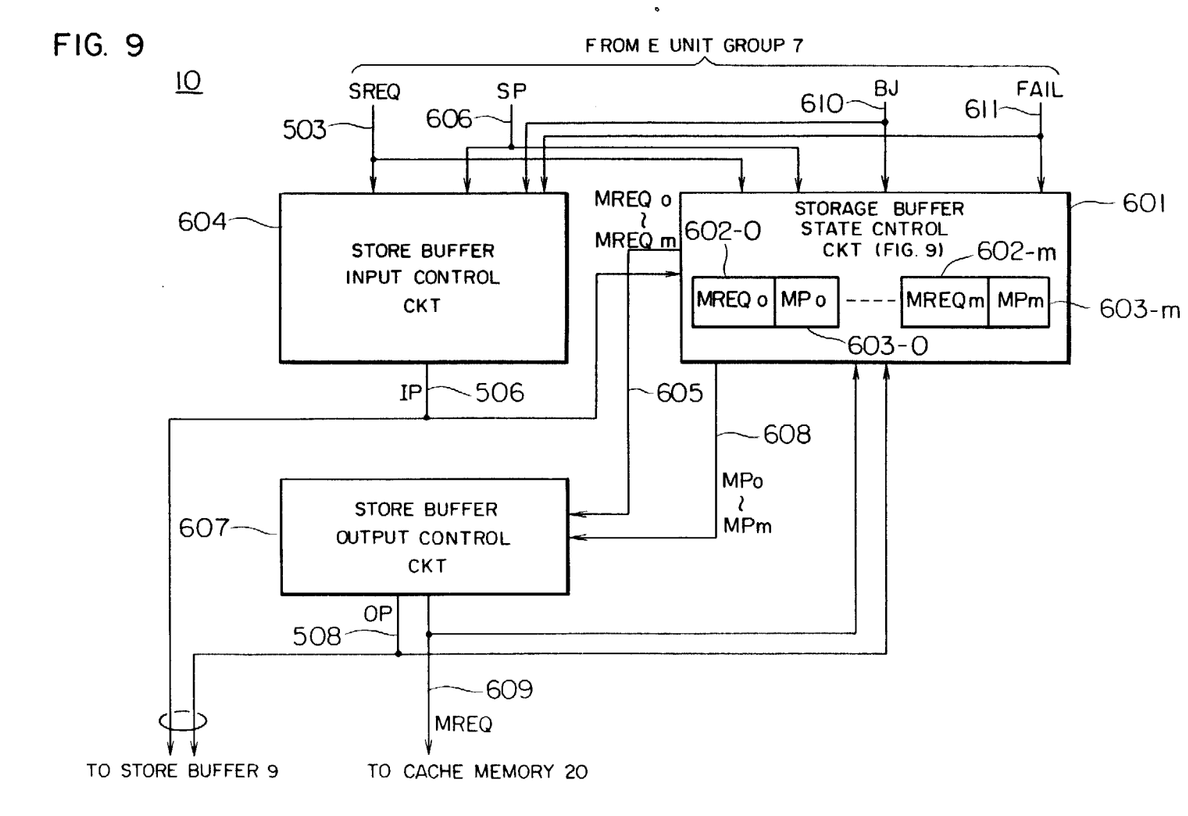
FIG. 9 is a simplified block diagram of the store buffer control circuit 10 in the system of FIG. 3.

FIG. 9 is a circuit block diagram illustrating the configuration of the store buffer control circuit 10. This circuit comprises a store buffer state control circuit 601 having request flags 602-0 to 602-m for indicating the presence/absence of a store request and predicted state flag registers 603-0 to 603-m for indicating whether or not the store request is in the predicted state, corresponding to the m+1 pairs of registers 501-0 and 502-0, ..., 501-m and 502-m. That is, the request flag register 602-0 and the predicted state flag register 603-0 corresponding to the 0-th register pair of the store data register 501-0 and the store address register 502-0, respectively of the store buffer 9 (FIG. 8) comprise a flip-flop for keeping a request flag MREQ0 indicating the presence of a store request and a flip-flop for keeping a predicted state flag MP0 indicating that the store request is due to an ST instruction being executed in the predicted state, respectively. Reference numerals 602-m and 603-m indicate a flip-flop for the request flag MREQm and a flip-flop for the predicted state flag MPm, corresponding to the m-th pair of the store data register 501-m and the store address register 502 m (FIG. 8), respectively.

Figure 10:
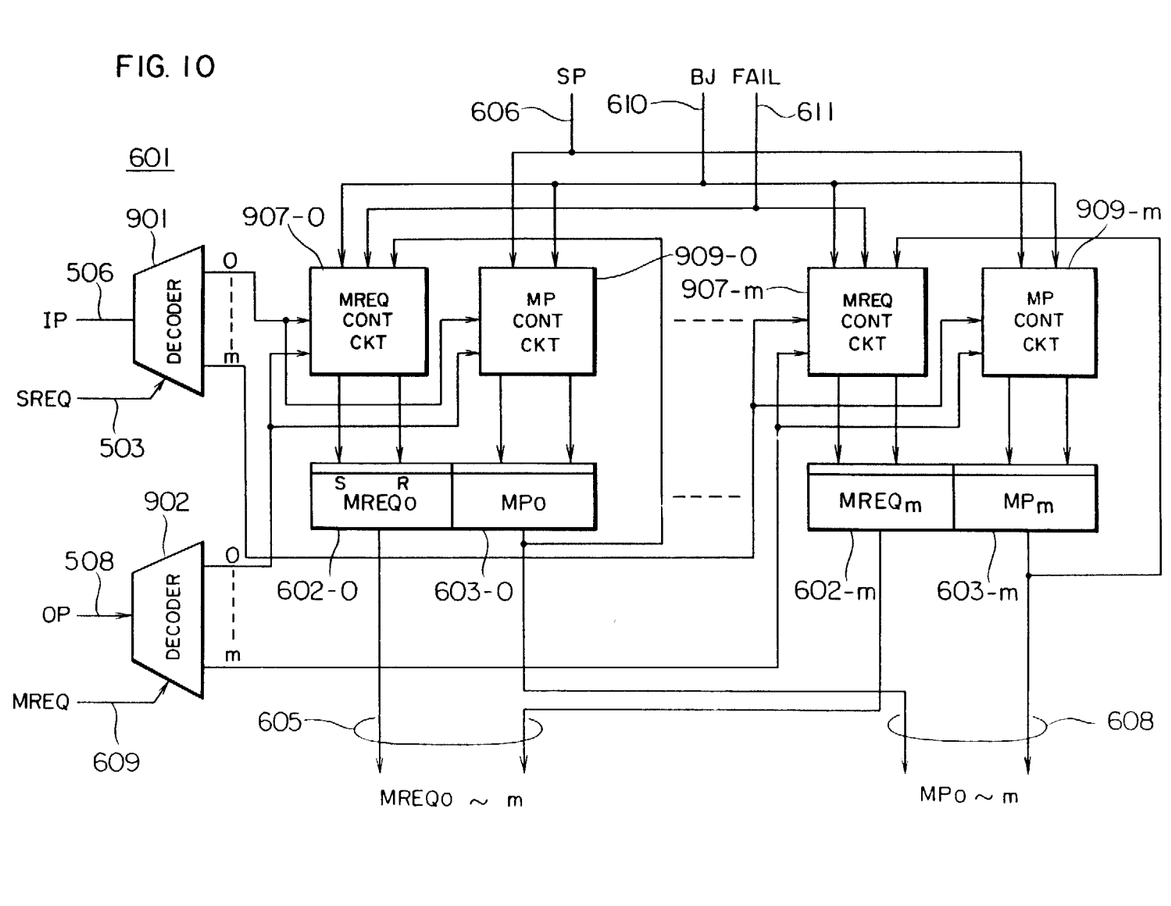
FIG. 10 is a circuit diagram of the store buffer control circuit 601 in the system of FIG. 9.

Referring now to FIG. 10, the store buffer state control circuit 601 will be described in detail. The control circuit comprises decoders 901–902, request flag flip-flops 602-0 to 602 m (from the 0-th flip-flop to the m-th flip-flop), predicted state flag flip-flops 603-0 to 603-m (from the 0th flip-flop to the m-th flip-flop), MREQ control circuits 907-0 to 907-m corresponding to the flip-flops 602-0 to 602-m, respectively, and MP control circuits 909-0 to 909-m. The decoder 901 receives an input pointer IP and a store request signal SREQ from the store buffer input control circuit 604 (FIG. 9) and the E unit group 7 (FIG. 3), respectively, and has decode output terminals which are m+1 in number.

When the store request SREQ is on, only the decode output associated with the number i indicated by the input pointer is turned on. If the store request SREQ is off, all decode outputs are turned off. The i-th decode output is delivered to the i-th MREQ control circuit 907-i and the i-th MP control circuit 909-i (where, i=0—m).

The decoder 902 receives an output pointer OP and a store request for the main storage, MREQ from the store buffer output control circuit 607 (FIG. 9) and has decode output terminals which are m+1 in number. When the MREQ is on, the decoder 902 turns on only an decode output associated with the number i indicated by the output pointer OP. If the MREQ is off, all decode outputs are turned off. The i-th decode output is delivered to the i-th MREQ, the i-th MREQ control circuit 907-i, and the i-th MP control circuit 909-i.

The i-th MREQ control circuit 907-i controls the set and reset lines of the i-th request flag flip-flop 602-i. Furthermore, the i-th MP control circuit 909-i controls the set and reset lines of the i-th predicted state flag flip-flop 603-i.

When the i-th output from the decoder 901 turns on, the i-th MREQ control circuit 907-i sets the i-th request flag flip-flop 602-i to one. When the i-th decode output from the decoder 902 turns on or when the branch judge signal BJ and the branch prediction fail signal FAIL turn on with the predicted state flag MPi being set to on, then the i-th MREQ control circuit 907-i resets the i-th request flag flip-flop 602-i. When the i-th decode output from the decoder 901 goes on, the MP control circuit 909-i sets or resets the i-th predicted state flag flip-flop 603-i so that the i-th predicted state flag MPi keeps the value of the SP. Moreover, when the i-th decode output from the decoder 902 an the branch judge signals BJ turn on, the i-th MP control circuit resets the i-th predicted state flag flip-flop MPi to zero. With these operations, a store request which cannot previously issue the MREQ even if the request flag is on because the prediction flag is on is now allowed to issue the MREQ, and hence a write operation on the main storage 3 can be effected. If the branch prediction is found to be unsuccessful, namely, the branch prediction fail signal FAIL is on when the branch judge signal is received, the MREQ signals ranging from MREQ0 to MREQm of which the corresponding prediction flags are on are reset to zero. At the same time, the MP signals including MP0 to MPm are entirely reset to zero. These operations cancel the store requests in the store buffer 9 which must not have been executed.

Returning now to FIG. 9, the store buffer input control circuit 604 generates a store buffer input pointer IP. To this end, the control circuit 604 receives a store request signal SREQ 503, a prediction flag signal SP 606, a branch judge signal BJ 610, and a branch prediction fail signal FAIL 611 from the E unit group 7.

Figure 11:
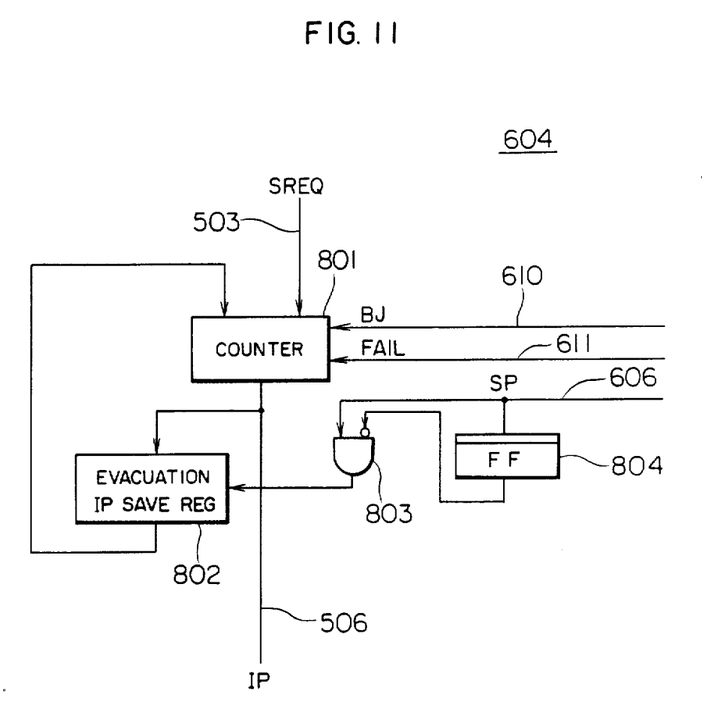
FIG. 11 is a circuit diagram of the store buffer input control circuit 604 in the circuit of FIG. 9.

Referring to FIG. 11, the store buffer input control circuit 604 will be described in detail. The control circuit 604 comprises a counter 801 (modulo m counter) for keeping the input pointer IP, an AND gate 803 to detect that the prediction flag signal S is on and that the previous prediction flag signal SP is off, an IP save register 802 to save the value of the IP when the output from the AND gate 803 is on and to retain the value until the output from the gate 803 is set to on again, and a flip-flop 804 to delay the prediction flag signal SP by one cycle and to send the value of the previous SP signal to the AND gate 803. Whenever the store request signal SREQ is turned on, the value of the counter 801 is updated (incremented by one according to modulo m). When the prediction flag signal SP is on and the previous SP signal is off, namely, at the first predicted state after the nonpredicted state, the value of the input pointer IP is stored in the IP save register 802. A branch judge signal BJ is then transmitted from the E unit group 7, and if the branch prediction fail signal FAIL is found to be on, the value of the IP save register 802 is set to the counter 801 again. Assume that the initial value of the counter 801 is zero, then the 0-th store data register 501-0 (FIG. 8) and the 0-th store address register 502-0 are assigned to the first ST instruction. After this point, each time a store request SREQ is issued by an ST instruction, the idle registers are sequentially indicated by the input pointer IP. When the predicted data is set, the next idle register number is stored in the IP save register 802. At a failure of the branch prediction, the register groups to which the canceled Store instructions are assigned are sequentially reallocated beginning from the register to which the oldest instruction has been allocated. That is, with respect to the ST instructions actually to be executed, the sequential numbers are assigned to the store data and address registers Returning now to FIG. 9, the store buffer output control circuit 607 generates the store buffer output pointer OP and the MREQ signal. To this end, the control circuit 607 receives the MREQ signals MREQ0 to MREQm via the signal line 605 and the predicted state flags MP0 to MPm via the signal line 608, respectively from the store buffer state control circuit 601.

Figure 12:
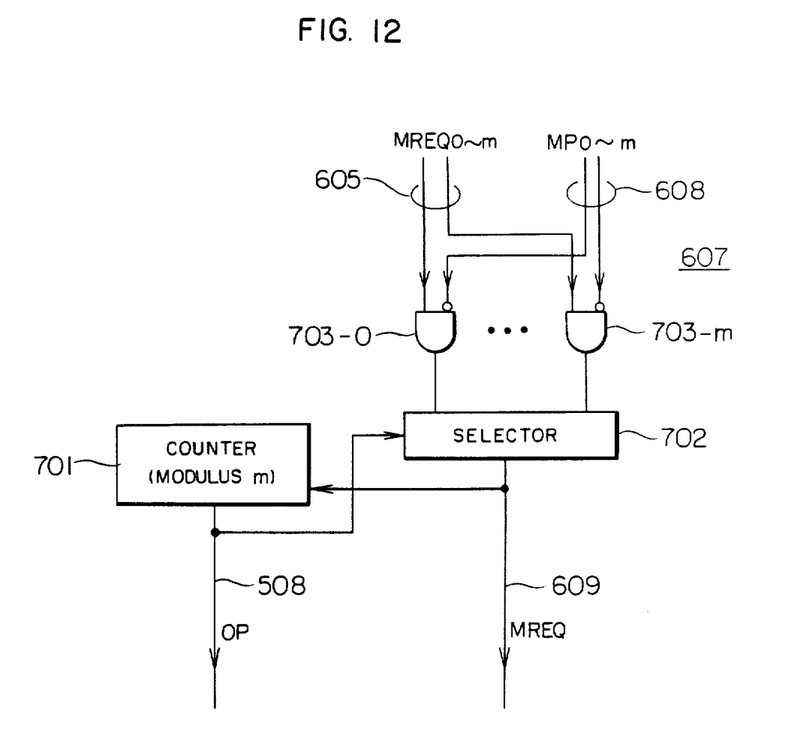
FIG. 12 a circuit block diagram of the store buffer output control circuit 607 in the circuit of FIG. 9.

Referring now to FIG. 12, the store buffer output control circuit 607 will be described in detail. The control circuit 607 comprises a counter 701 (modulo m counter) to keep the output pointer OP, AND gates 703-0 to 703-m which are m+1 in number and are disposed corresponding to the store data registers 501-0 to 501-m and the store address registers 502-0 to 502-m. respectively, and a selector 702. The AND gate 703-i turns its output on when the MREQi is on and the predicted state flag signal MPi is off (i=0−m) and delivers the output signal to the selector 702. Among these inputted signals, the signal indicated by the output pointer OP is fed as the MREQ to the signal line 609. When the MREQ is on, the value of the counter 701 is incremented by one (modulo m) during the next cycle. Then, the number (i) to be assigned to the store data register 501-i and the store address register 502-i used for the first Store instruction is set as the initial value of the counter 701 (this value is 0 in this case). It should be understood that the value of the output pointer OP outputted from the counter 701 when the MREQ is issued is equal to the number assigned to the store data and address registers 501-i, 502-i allocated to the oldest Store instruction stored in the store buffer 9 among the Store instructions in the nonpredicted state. The MREQ naturally indicates a data write request from tne ST instruction to write data in the main storage 3.

The MREQ signal, the store data, and the store address are transmitted via the signal lines 609, 512, and 511, respectively to the cache memory 20, thereby completing the operation of the Store instruction.

The cache memory 20 of FIG. 8 has been well known to those skilled in the art. The cache memory is configured in one of two primary structures according to the known technology. Namely, in a store-through type cache memory, when a store access to the main storage takes place, the main storage writes the store data therein in any cases, while it writes the store data in the cache memory only when the data is found in the address location of the cache memory specific for the store access. In a store-in type cache memory, on the other hand, when a store access to the main storage occurs, the main storage writes the store data in the cache memory in any cases without writing the data in the main storage. If the cache memory does not contain data associated with the store data, the main storage 3 is accessed to read data from an area including the address (the data is called a block), then the store data associated with the store access is written in the cache memory.

The cache memory 20 of FIG. 8 may be configured in either type of these memory structures.

If the cache memory 20 is of the store-in type, the operation to write the store data in the main storage 3 is not conducted at store access. That is, even if the store data written by a Store instruction executed in the predicted state is invalid, the invalid data cannot be mistakenly used by another CPU or channel even in the prior art system. According to the present invention, however, such an invalid data cannot be written in the cache memory 20, which leads to an effect that the operation to correct data in the cache memory is unnecessary.

Even with a store-in type cache memory 20, if the cache memory 20 is commonly used together with another CPU or if it has a shared cache memory section, an invalid data mistakenly written in the shared memory section may possibly be read by another CPU in the prior art technique. This disadvantage can be removed according to the present invention.

On the other hand, when the cache memory 20 is of the store-through type, since the store data is written in the main storage 3 in any cases, another CPU using the main storage 3 may access the invalid store data mistakenly written, which can be solved according to the present invention. Naturally, the operation to correct the invalid data in the main storage 3 is unnecessary.

In addition to the branch judgement, other operations to which other embodiments of the present invention are applicable are as follows; a predictive operation to predict data of the branch destination instruction in a branch instruction as disclosed in the Japanese Patent Unexamined Publication No. 54-9456 and an operation to predict an operation result of a preceding instruction when processing two instructions that cause a register conflict as disclosed in the Japanese Patent Application No. 58-237778. These references are incorporated herein by reference.

We claim:
1. A data processor comprising:
processing means for decoding a plurality of instructions, for executing a succeeding instruction in concurrence with a preceding instruction previously decoded, said succeeding instruction being executed by prediction that a predetermined execution result will be obtained for said preceding instruction when validity of an execution result of said succeeding instruction is dependent on a true execution result of said preceding instruction, and for outputting an execution result data of said succeeding instruction, a write address representing a location to write said execution result data, and a flag signal indicating that said execution result data is provided for an instruction which was executed based on said prediction, said processing means including means for providing a validity signal for indicating whether or not said true execution result of said preceding instruction coincides with said predetermined execution result;
means connected to said processing means for storing said execution result data, said write address, and said flag signal obtained as a result of execution of said succeeding instruction; and control means responsive to said validity signal and including means for transferring said execution result data and said write address from said sotring means to a main memory when said valdiity signal indicates that said prediction is correct and for invalidating said execution result data and said write address stored in said storing means when said validity signal indicates that said prediction is incorrect.

2. A data processor according to claim 1, wherein:
said processing means includes execution control means for outputting said flag signal and said execution result data and said write address of each instruction;
said storing means including register means for storing said execution result data said write address and said flag signal associated with at least one instruction outputted from said processing means; and
said control means includes means responsive to said flag signal stored in said storing means for transferring said execution result data and said write address, without waiting for said validity signal to be input to said control means, when said flag signal indicates that said execution result data and said write address is provided for an instruction which was executed based on said true execution result and for either transferring or invalidating said execution result data and said write address in response to said validity signal indicating that said prediction is either correct or incorrect, respectively, when said flag signal indicates that said execution is conducted in said predicted state.

3. A data process according to claim 1, wherein said processing means includes means for executing selected succeeding instructions after a conditional branch instruction and before completion of a test of a condition designated by said conditional branch instruction.

4. A data processor according to claim 1, wherein
said storing means stores an execution result data and said write address obtained as a result of an execution of a Store instruction such that said execution result data is stored at said write address of said main memory.

5. A data processor according to claim 4, further comprising cache memory means connected to said main memory for storing a portion of data stored in said main memory, said cache memory means including means, responsive to an access request to said main storage, for executing an access to at least one of said cache memroy means and said main storage, and wherein said control means includes means for transferring asid execution result data and said write address stored in said storing means to said cache memory means.

6. A data processor according to claim 3, wherein
said storing means stores an execution result data and said write address obtained as a result of an execution of a store instruction such that said execution result data is stored at said write address of said main memory.

7. A data processor according to claim 6, further comprising cache memory means connected to said main memory for storing a portion of data stored in said main memory, said cache memory means including means, responsive to an access request to said main storage, for executing an access to at least one of said cache memory means and said main storage, and wherein said control means includes means for transferring said execution result data and said write address stored in said storing means to said cache memory means.

8. A data processor according to claim 1, wherein said control means includes means for transferring said execution reuslt data and said write address stored in said storing means to a main memory means which is accessible by another processing means.

9. A data processor comprising:
decode means for decoding a plurality of instructions;
a plurality of operation means each for outputting operation result data for a decoded instruction and a condition code determined by said operation result data;
supplying means for sequentially supplying said plurality of operation means with said instructions decoded by said decode means, each instruction being supplied to one operation means, said supplying means including means for outputting a number of the operation means to which an instruction has been last supplied; and
branch instruction execution means connected to said decode means for receiving a branch instruction decoded by said decode means, a number corresponding to an operation means outputted from said number outputting means, and a plurality of condition codes repsectively outputted from said operation means, said branch instruction execution means including means for determining whether or not a branch condition of said branch instruction is satisfied based on the condition code outputted from the operation means corresponding to said number.

10. A data processor according to claim 9, wherein:
said decode means includes means for decoding, without waiting for completion of an execution of said branch instruction, one of a first instruction to be executed when the branch condition of said branch instruction is satisfied and a second instruction to be executed when the branch condition of said branch instruction decoded is not satisfied;
said branch instruction execution means includes means, responsive to said branch instruction for supplying a prediction signal indicating to said operation means that the execution is being provided based on a prediction until completion of the determination whether or not the branch condition of said branch instruction is satisfied, means for determining, based on the result of the branch condition, whether or not the execution of said first or second instruction is correct, and means for outputting a prediction validity indication signal indicating a result of the correctness of said prediction to said operation means; and
each of said operation means having means responsive to said prediction signal for outputting an a flag indicating that the execution is being provided based on a prediction and the operation result of an instruction inputted from said decode means when said prediction signal is inputted to said operation means;
said data processor further comprising means responsive to said prediction validity indication signal indicating that said prediction is incorrect to invalidate operation result data outputted from one of said plurality of operation means when said flag signal is assigned to the operation result data. r

* * * * *